US012635043B2

(12) United States Patent
Jeong et al.

(10) Patent No.: US 12,635,043 B2
(45) Date of Patent: May 19, 2026

(54) COOKING APPARATUS

(71) Applicant: SAMSUNG ELECTRONICS CO., LTD., Suwon-si (KR)

(72) Inventors: Jiho Jeong, Suwon-si (KR); Eonjoong Kim, Suwon-si (KR); Inki Jeon, Suwon-si (KR); Gyeongjin Kim, Suwon-si (KR); Jiheon Ryu, Suwon-si (KR); Taeseob Lim, Suwon-si (KR); Seunggee Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 753 days.

(21) Appl. No.: 18/054,839

(22) Filed: Nov. 11, 2022

(65) Prior Publication Data

US 2023/0087445 A1 Mar. 23, 2023

Related U.S. Application Data

(63) Continuation of application No. PCT/KR2021/005974, filed on May 13, 2021.

(30) Foreign Application Priority Data

May 15, 2020 (KR) ........................ 10-2020-0058376

(51) Int. Cl.
*H05B 6/68* (2006.01)
*H05B 6/64* (2006.01)
*H05B 6/80* (2006.01)

(52) U.S. Cl.
CPC ........... *H05B 6/687* (2013.01); *H05B 6/6408* (2013.01); *H05B 6/6414* (2013.01); *H05B 6/6444* (2013.01); *H05B 6/80* (2013.01)

(58) Field of Classification Search
CPC ...... H05B 6/64; H05B 6/6402; H05B 6/6408; H05B 6/6414; H05B 6/647; H05B 6/6473;
(Continued)

(56) References Cited

U.S. PATENT DOCUMENTS 4,081,646 A 3/1978 Goltsos
8,651,276 B2 2/2014 Galluch
(Continued)

FOREIGN PATENT DOCUMENTS

CN 1162090 A 10/1997
CN 101309623 A 11/2008
(Continued)

OTHER PUBLICATIONS

Office Action issued Jun. 25, 2024, in connection with Korean Patent Application No. 10-2020-0058376, 19 pages.
(Continued)

*Primary Examiner* — Hung D Nguyen

(57) ABSTRACT

A cooking apparatus includes a cooking chamber, a first heating source disposed on an upper side of the cooking chamber, a second heating source disposed on a lower side of the cooking chamber, and a shelf. The first heating source includes including a plurality of heaters and the second heating source includes a magnetron configured to generate high-frequency waves. The cooking chamber includes a first cooking area formed above the shelf and a second cooking area formed below the shelf. The first cooking area supporting a first object to be cooked using the first heating source and the second heating source. The second cooking area supporting a second object to be cooked using the second heating source. The shelf includes a cooking surface and a
(Continued)

heat generator. The heat generator is configured to generate heat due to the high-frequency waves and transfer the heat to the cooking surface.

19 Claims, 13 Drawing Sheets

(58) Field of Classification Search
CPC .. H05B 6/6482; H05B 6/6485; H05B 6/6444; H05B 6/6488; H05B 6/6494; H05B 6/687; H05B 6/72; H05B 6/725; H05B 6/74; H05B 6/745; H05B 6/80; A47J 37/0623; A47J 37/0629
See application file for complete search history.

(56) References Cited

U.S. PATENT DOCUMENTS

2007/0108089 A1* 5/2007 Galluch .................. B65D 1/34 206/558
2010/0270292 A1 10/2010 Uchiyama
2010/0276417 A1 11/2010 Uchiyama et al.
2010/0282742 A1 11/2010 Uchiyama
2011/0198344 A1 8/2011 Uchiyama
2016/0088691 A1* 3/2016 Cheong ................. H05B 6/745 219/746
2016/0192446 A1 6/2016 Seddik
2017/0006669 A1* 1/2017 Kamei ............. G06K 19/06037
2017/0099988 A1* 4/2017 Matloubian ......... A47J 37/0664
2018/0152991 A1 5/2018 Hall et al.
2020/0284438 A1* 9/2020 Gigante ................. H05B 6/766

FOREIGN PATENT DOCUMENTS

CN 101910731 A 12/2010
CN 101910732 A 12/2010
CN 101910733 A 12/2010
CN 105605630 A 5/2016
CN 109793431 A 5/2019
EP 2897503 B1 5/2019
JP H07177982 A 7/1995
JP 2006097988 A 4/2006
JP 2007143804 A 6/2007
JP 5861029 B2 2/2016
JP 5899426 B2 4/2016
JP 2016141438 A 8/2016
JP 2017015383 A 1/2017
JP 2017146053 A 8/2017
KR 10-0109938 B1 12/1996
KR 10-0311914 B1 2/2002
KR 10-2004-0049483 A 6/2004
KR 10-0526205 B1 11/2005
KR 10-2006-0013843 A 2/2006
KR 10-2012-0114529 A 10/2012
KR 10-1266102 B1 5/2013
KR 10-1395482 B1 5/2014
KR 10-1738634 B1 7/2017
KR 10-2018-0036448 A 4/2018
WO 2014044627 A2 3/2014

OTHER PUBLICATIONS

International Search Report and Written Opinion of the International Searching Authority dated Aug. 18, 2021, in connection with International Application No. PCT/KR2021/005974, 10 pages.
Supplementary European Search Report dated Aug. 3, 2023, in connection with European Patent Application No. 21803028.6, 9 pages.
Office Action issued Oct. 31, 2025, in connection with Chinese Patent Application No. 202180035448.5, 24 pages.

* cited by examiner

COOKING APPARATUS

CROSS-REFERENCE TO RELATED APPLICATIONS

This application is a bypass continuation of International Application No. PCT/KR2021/005974, filed May 13, 2021, which claims priority to Korean Patent Application No. 10-2020-0058376, filed May 15, 2020, the disclosures of which are herein incorporated by reference in their entirety.

BACKGROUND

Field

The present disclosure relates to a cooking apparatus, and more particularly, to a cooking apparatus in which a cooking space inside a cooking chamber is divided.

2. Description of Related Art

Cooking apparatuses are apparatus for heating and cooking an object to be cooked, such as food, and refer to devices that provide various functions related to cooking such as heating, defrosting, drying, and sterilizing of a target to be cooked. Examples of such cooking apparatuses include an oven such as a gas oven or an electric oven, a microwave heating device (hereinafter referred to as a microwave), a gas stove, an electric stove, a gas grill, an electric grill, and the like.

Generally, an oven is an appliance for cooking food by directly transferring heat to food through a heating source generating heat, such as a heater, or by heating the inside of a cooking chamber, and a microwave is an appliance for cooking food by intermolecular frictional heat generated as the molecular arrangement of food is disturbed with high-frequency waves as a heating source.

When two or more different foods are cooked through a cooking apparatus, an optimum temperature for cooking each food may be different. Here, the cooking apparatus can only cook food at the same temperature at the same time, and thus, when different foods are simultaneously cooked through the cooking apparatus, a problem in which some foods are undercooked or overcooked may occur.

SUMMARY

It is an aspect of the present disclosure to provide a cooking apparatus capable of, during simultaneous cooking of two or more different foods by the cooking apparatus, allowing the foods to be cooked at different optimum temperatures.

It is another aspect of the present disclosure to provide a cooking apparatus capable of, through efficient division of a cooking area, allowing two or more different foods to be easily cooked inside a cooking chamber.

A cooking apparatus according to one aspect of the present disclosure includes a cooking chamber open in a front-rear direction, a first heating source disposed on an upper side of the cooking chamber and including a plurality of heaters, a second heating source disposed on a lower side of the cooking chamber and including a magnetron configured to generate high-frequency waves, and a shelf provided to be insertable into the cooking chamber in the front-rear direction and configured to divide the cooking chamber in a vertical direction, wherein the cooking chamber includes a first cooking area which is formed above the shelf and in which a first object to be cooked, which is cooked by the first heating source and the second heating source, is cooked and a second cooking area which is formed below the shelf and in which a second object to be cooked, which is cooked by the second heating source, is cooked, the shelf includes a cooking surface which is provided to face the first heating source and on which the first object to be cooked is placed and a heat generator which is provided to face the second heating source and configured to generate heat due to the high-frequency waves oscillated from the second heating source and transfer the heat to the cooking surface, and the shelf is provided to be disposed closer to the first heating source than to the second heating source.

A separation distance between a lower end of the plurality of heaters and the cooking surface may be provided to be approximately up to 100 mm or less.

The plurality of heaters may each include a long axis extending in the front-rear direction, a first heater among the plurality of heaters may be disposed at a first position in a left-right direction with respect to a center of the cooking chamber, and a second heater among the plurality of heaters may be disposed at a second position which is a position opposite to the first position with respect to the center of the cooking chamber.

The cooking surface may include a first cooking surface disposed to correspond to the first heater in the vertical direction and a second cooking surface disposed to correspond to the second heater in the vertical direction, and a temperature of heat supplied to the first cooking surface and a temperature of heat supplied to the second cooking surface may be provided to be different from each other.

The first cooking surface may be provided so that the first object to be cooked is placed thereon, and the second cooking surface may be provided so that a third object to be cooked, whose optimum cooking temperature is different from an optimum cooking temperature of the first object to be cooked and which is cooked in the first cooking area, is placed thereon.

The cooking surface may be provided in a substantially quadrangular shape and may be provided to have a long side in the left-right direction and a short side in the front-rear direction.

A length of the long side may be provided to be about 1.5 to 2 times a length of the short side.

An area of the shelf in the vertical direction may be provided to be about 0.9 to 1 times an area of the cooking chamber in the vertical direction.

The cooking surface may be formed on an upper surface of the shelf, the heat generator may be disposed on a lower surface of the shelf, and an area of the cooking surface in the vertical direction may be provided to correspond to an area of the heat generator in the vertical direction.

The cooking apparatus may further include a first light configured to radiate light of a first color toward the first cooking surface and a second light configured to radiate light of a second color different from the first color toward the second cooking surface.

The first heater may be provided to have a first color filter provided so that a first color is shown during heat generation, and the second heater may be provided to have a second color filter provided so that a second color different from the first color is shown during heat generation.

The first cooking surface may include a first seating portion on which a first container holding the first object to be cooked is seated, and the second cooking surface may include a second seating portion on which a second container holding the third object to be cooked is seated.

The first seating portion and the second seating portion may each be provided in the shape of a hole that is open in the vertical direction.

The shelf may further include a seating portion on which a container including a first accommodation space configured to hold the first object to be cooked and a second accommodation space configured to hold the third object to be cooked is seated, and the seating portion may be provided so that the first accommodation space is disposed at a position corresponding to the first heater in the vertical direction and the second accommodation space is disposed at a position corresponding to the second heater in the vertical direction.

The second heating source may further include a stirrer provided to transmit the high-frequency waves generated from the magnetron to the inside of the cooking chamber, and the stirrer may be provided in a circular shape having a diameter of 150 mm or more.

A cooking apparatus according to one aspect of the present disclosure includes a cooking chamber open in a front-rear direction, a first heating source disposed on an upper side of the cooking chamber and including a first heater and a second heater disposed apart from each other in a left-right direction, a second heating source disposed on a lower side of the cooking chamber and including a magnetron configured to generate high-frequency waves, and a shelf provided to be insertable into the cooking chamber in the front-rear direction and configured to divide the cooking chamber in a vertical direction, wherein the cooking chamber includes a first cooking area formed above the shelf and a second cooking area. formed below the shelf, the first cooking area is provided to he divided in the left-right direction into a first area and a second area which are configured to receive heat at different temperatures due to the first heater and the second heater, and the first cooking area is provided to be disposed closer to the first heating source than to the second heating source.

The shelf may include a cooking surface which is provided to face the first heating source and on which a first object to be cooked is placed and a heat generator which is provided to face the second heating source and configured to generate heat due to the high-frequency waves oscillated from the second heating source and transfer the heat to the cooking surface.

The cooking surface may be provided in a substantially quadrangular shape and may be provided to have a long side in the left-right direction and a short side in the front-rear direction, and a length of the long side may be provided to be about 1.5 to 2 times a length of the short side.

An area of the shelf in the vertical direction may be provided to be about 0.9 to 1 times an area of the cooking chamber in the vertical direction.

A cooking apparatus according to one aspect of the present disclosure includes a cooking chamber open in a front-rear direction in a first direction, a shelf insertable into the cooking chamber in the first direction, and a plurality of heaters disposed at one side of the cooking chamber in a second direction orthogonal to the first direction and configured to provide heat to the shelf, wherein the plurality of heaters each include a long axis extending in the first direction and are provided to be apart from each other in a third direction which is orthogonal to the first direction and the second direction, the shelf includes a long side extending in the third direction and a short side extending in the first direction, and a length ratio of the long side and the short side may be provided to be in a range of 1.5:1 to 2:1.

In a cooking apparatus according to one aspect of the present disclosure, a plurality of cooking spaces in which a plurality of heaters provide different temperatures are disposed to be efficiently divided from each other. Accordingly, two or more different foods can be easily placed in the plurality of spaces divided from each other inside a cooking chamber, and thus two or more different foods can be easily simultaneously cooked through the cooking apparatus.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code, The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
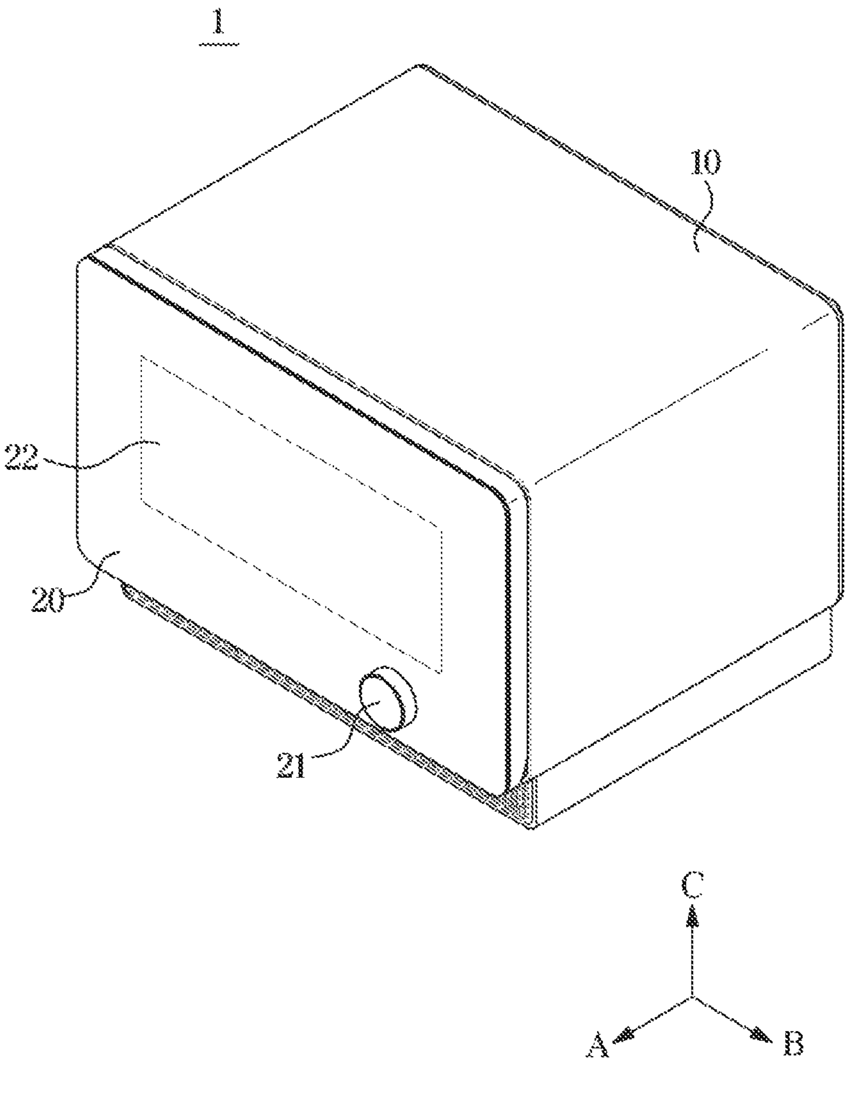
FIG. 1 illustrates a perspective view of a cooking apparatus according to an embodiment of the present disclosure.

FIGS. 1 through 13, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments described herein and configurations illustrated in the drawings are merely exemplary embodiments of the present disclosure, and various modifications which may replace the embodiments and the drawings herein may be present at the time of filing this application.

Like reference numerals or symbols presented in the drawings of the application indicate parts or elements that perform substantially the same functions.

Terms used herein are for describing the embodiments and are not intended to limit and/or restrict the disclosure. A singular expression includes a plural expression unless context clearly indicates otherwise. In the application, terms such as "include" or "have" are for designating that features, numbers, steps, operations, elements, parts, or combinations thereof are present, and do not preclude the possibility of presence or addition of one or more other features, numbers, steps, operations, elements, parts, or combinations thereof in advance.

Terms including ordinals such as "first" and "second" used herein may be used to describe various elements, but the elements are not limited by the terms, and the terms are only used for the purpose of distinguishing one element from another element. For example, a first element may be referred to as a second element while not departing from the scope of the present disclosure, and likewise, a second element may also be referred to as a first element. The term "and/or" includes a combination of a plurality of related described items or any one item among the plurality of related described items.

A microwave will be described as an example of a cooking apparatus according to one embodiment of the present disclosure. However, the present disclosure is not limited thereto, and the cooking apparatus according to one embodiment of the present disclosure may also apply to other cooking apparatuses such as an oven.

Hereinafter, exemplary embodiments according to the present disclosure will be described in detail with reference to the accompanying drawings.

Figure 2:
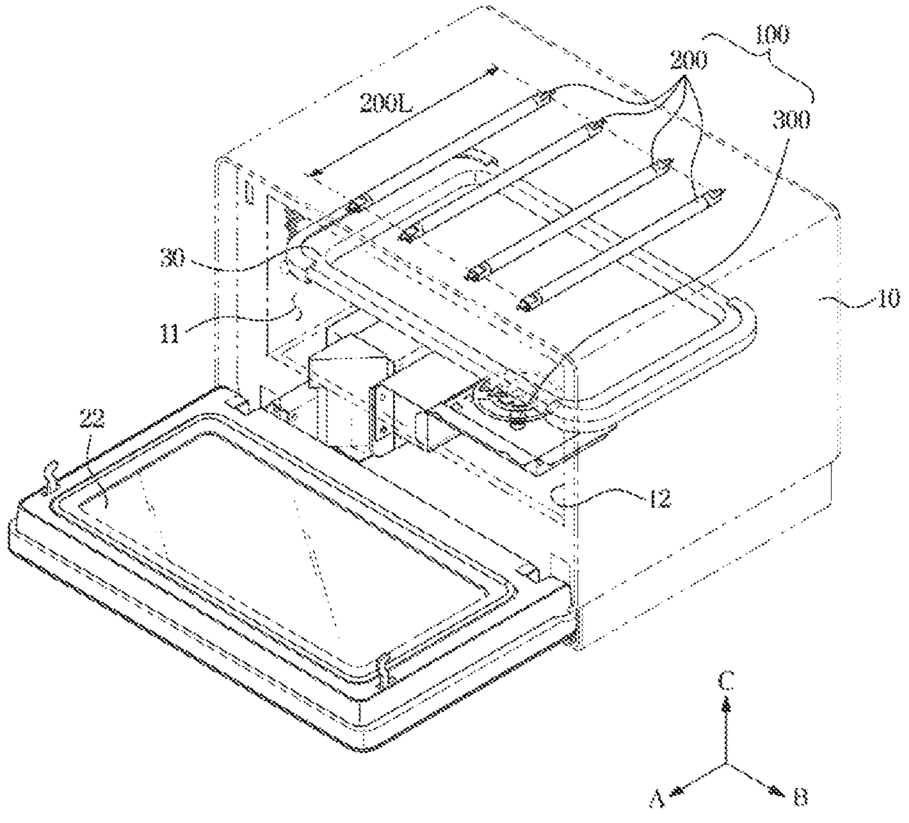
FIG. 2 illustrates a partial configuration of the inside of the cooking apparatus according to an embodiment of the present disclosure.
Figure 3:
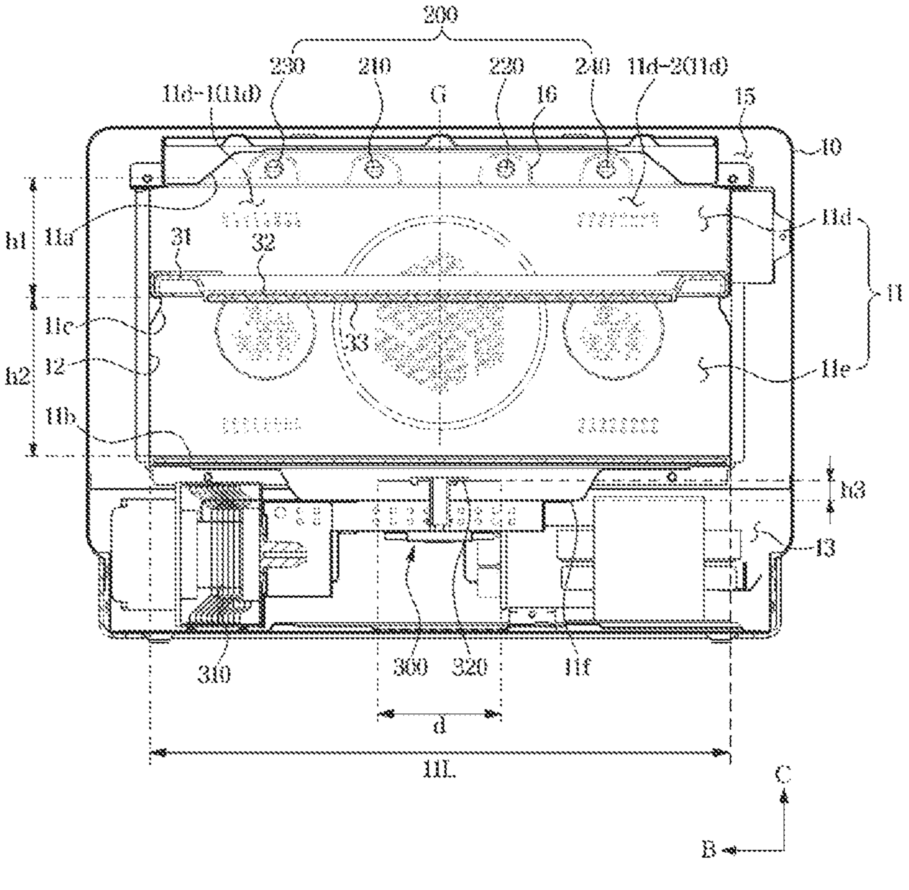
FIG. 3 illustrates a cross-sectional view of the cooking apparatus according to an embodiment of the present disclosure.

FIG. 1 illustrates a perspective view of a cooking apparatus according to an embodiment of the present disclosure, FIG. 2 illustrates a partial configuration of the inside of the cooking apparatus according to an embodiment of the present disclosure, and FIG. 3 illustrates a cross-sectional view of the cooking apparatus according to an embodiment of the present disclosure.

A cooking apparatus 1 may include a housing 10 configured to form an exterior and a cooking chamber 11 provided inside the housing 10 and in which an object to be cooked may be placed.

The cooking apparatus 1 may include an inner housing 12 disposed inside the housing 10 and configured to form the cooking chamber 11. A predetermined separation space 15 may be formed between the inner housing 12 and the horsing 10.

The housing 10 and the inner housing 12 may be provided to be open in a first direction A which is a direction toward the front of the cooking apparatus 1.

A user may place an object to be cooked inside the cooking chamber 1 through an opening of the inner housing 12 that is formed in the first direction A.

The cooking chamber 11 may be provided in a substantially rectangular parallelepiped shape that has a long side in a second direction B which is a left-right direction and is orthogonal to the first direction A.

The cooking apparatus 1 may include a machine room 13 formed inside the housing 10 and disposed below the cooking chamber 11. Various electronic components configured to operate the cooking apparatus 1 may be disposed inside the machine room 13.

The cooking apparatus may include a door 20 provided to open and close the housing 10 and the opening of the inner housing 12, The door 20 may include an input device 21 through which a user inputs a signal to control the cooking apparatus 1. The input device 21 is not limited to that illustrated in FIG. 1 and may include a display device (not illustrated) configured to display an image or a touch device (not illustrated) provided to allow a signal to be input by touching an image.

The door 20 may include a transparent member 22 provided to allow a user to observe the inside of the cooking chamber 11 while the door 20 is closed.

The cooking apparatus 1 may include a. shelf 30 mounted inside the cooking chamber 11 and provided to allow a user to place an object to be cooked. The shelf 30 may be detachably disposed inside the cooking chamber 11.

The cooking chamber 11 may include a support 11*c* formed at both side surfaces of the cooking chamber 11 so that the shelf 30 is mounted between an upper surface 11*a* and a lower surface 11*b* of the cooking chamber 11.

For the shelf 30 to be mounted at various heights, the support 11*c* may be provided as a plurality of supports 11*c* in a third direction C which is a vertical direction and is orthogonal to the first direction A or the second direction B.

The shelf 30 may include a main body 31 and a cooking surface 32 on which an object to be cooked may be placed. The cooking surface 32 may be provided to face the upper surface 11*a* of the cooking chamber 11 while the shelf 30 is mounted inside the cooking chamber 11. 00671 The cooking apparatus 1 may include a heating source 100 configured to provide heat to the inside of the cooking chamber 11 so that an object to be cooked is cooked by the heat.

The heating source 100 may be provided so that heat is provided to an object to be cooked placed on the shelf 30 and the object to be cooked is cooked. Also, an object to be cooked may be placed on the lower surface 11*b* of the cooking chamber 11 without the shelf 30. Even in this case, the heating source 100 may provide heat to the object to be cooked placed on the lower surface 11*b*.

The heating source 100 may include a first heating source 200 disposed on the upper surface 11*a* of the cooking chamber 11.

The heating source 100 may include a second heating source 300 disposed on the lower surface 11*b* of the cooking chamber 11.

The first heating source 200 may include a plurality of heaters 210, 220, 230, and 240 configured to generate radiant heat. The plurality of heaters 210, 220, 230, and 240 may radiate heat generated by themselves and directly transfer heat to an object to be cooked. The plurality of heaters 210, 220, 230, and 240 include a middle portion 241 and two end portions 242.

The second heating source 300 may include a magnetron 310 configured to generate high-frequency waves. The high-frequency waves generated by the magnetron 310 may be radiated into an object to be cooked so that the inside of the object to be cooked is cooked by frictional heat between molecules that is generated as the high-frequency waves repeatedly change the molecular arrangement of moisture contained in the object to be cooked.

The magnetron 310 may be disposed in the machine room 13. The second heating source 300 may oscillate high-frequency waves from the machine room 13 toward the lower surface 11*b* of the cooking chamber 11, and the high-frequency waves may pass through the lower surface 11*b* and be radiated toward the shelf 30.

A microwave-type cooking apparatus is provided so that an object to be cooked is cooked using a single magnetron. Embodiments of the present disclosure take into consideration that according to the distribution or content of moisture in an object to be cooked, high frequency waves may not be thoroughly transmitted to the entire object to be cooked. Thus, there is a problem that the object to be cooked is not efficiently cooked.

Accordingly, a heater configured to transfer heat to the entire object to be cooked may be additionally mounted in the microwave to address the above problems. In particular, for an object to be cooked that should be cooked at a higher temperature from the outside, cooking may be efficiently performed through heat of the additional heater.

The cooking apparatus 1 according to one embodiment of the present disclosure may also include the first heating source 200 and the second heating source 300 so that cooking of an object to be cooked is efficiently performed.

Since the first heating source 200 is disposed on the upper surface 11*a* of the cooking chamber 11 as described above, the radiant heat may be efficiently transferred to an upper side of an object to be cooked, but it may be difficult for the heat to be transferred to a lower side of the object to be cooked.

Here, in order to allow additional heat to be transferred to the lower side of the object to be cooked, a user may stop the operation of the cooking apparatus 1, take the shelf 30 out of the cooking chamber 11, turn over the object to be cooked, put the shelf 30 back into the cooking chamber 11, and then restart the operation of the cooking apparatus 1. Embodiments of the present disclosure take into consideration that this may be inconvenient for the user.

In order to address such a problem, the cooking apparatus 1 according to one embodiment of the present disclosure may include a heat generator 33 disposed on the shelf 30 so that, during cooking, heat is also transferred to the lower side of the object to be cooked.

The heat generator 33 may be disposed on a side of the main body 31 of the shelf 30 that is opposite to the cooking surface 32. The heat generator 33 may be provided to face the lower surface 11*b* of the cooking chamber 11 while the shelf 30 is mounted inside the cooking chamber 11.

The heat generator 33 may absorb the high-frequency waves generated from the magnetron 310 and generate heat. The high-frequency waves radiated from the magnetron 310 facing the heat generator 33 may be absorbed into the heat generator 33, and the heat generator 33 may generate heat using the absorbed high-frequency waves.

The heat generated from the heat generator 33 may be transferred to the cooking surface 32 through the main body 31 of the shelf 30.

That is, as the heat generated from the heat generator 33 is conducted to the cooking surface 32, heat may be supplied to the lower side of the object to be cooked placed on the cooking surface 32.

The heat generator 33 may be made of a ferrite material to absorb high-frequency waves. However, the present disclosure is not limited thereto, and a material that can generate heat using high-frequency waves may be mixed with a ceramic or the like and form the heat generator 33.

Accordingly, even when the user does not turn over the object to be cooked, heat can be supplied to the object to be cooked from above and below the object to be cooked, and thus, cooking can be efficiently performed.

The shelf 30 may be provided to divide an area inside the cooking chamber 11.

The shelf 30 may divide the inside of the cooking chamber 11 in the vertical direction into a first cooking area 11*d* formed above the shelf 30 and a second cooking area 11*e* formed below the shelf 30.

The first cooking area 11*d* may be provided so that an object to be cooked, which is cooked by the first heating source 200 and the second heating source 300, is disposed therein. That is, the object to be cooked disposed in the first cooking area 11*d* may be cooked by heat generated from the plurality of heaters 210, 220, 230, and 240 and the heat generator 33.

The second cooking area 11*e* may be provided so that an object to be cooked, which is cooked by the second heating source 300, is disposed therein. That is, the object to be cooked disposed in the second cooking area 11*e* may be cooked by the high-frequency waves generated from the second heating source 300.

Due to the inside of the cooking chamber 11 being divided by the shelf 30, objects to be cooked having different cooking methods may be disposed inside the cooking chamber 11 and simultaneously cooked in the cooking chamber 11.

That is, even in a case in which an object to be cooked which is cooked by external heat is disposed in the first cooking area 11*d* and an object to be cooked which is cooked by high-frequency waves is disposed in the second cooking area 11*e*, the first and second heating sources 200 and 300 may be simultaneously operated, and thus the objects to be cooked may be simultaneously cooked.

Accordingly, since objects to be cooked which are cooked using different cooking methods can be cooked at one time in the same cooking chamber 11, user convenience can be increased.

As will be described below, an area of the shelf 30 in the third direction C may be formed to correspond to an area of the cooking chamber 11 in the third direction C. Accordingly, transfer of heat generated by the first heating source 200 in the first cooking area 11*d* to the second cooking area 11*e* may be partially blocked.

Also, movement of high-frequency waves oscillated in the second cooking area 11*e* to the first cooking area 11*d* may be partially blocked.

Therefore, cooking may be independently performed in the first cooking area 11*d* and the second cooking area 11*e*.

The cooking apparatus 1 having the cooking chamber 11 formed in a rectangular parallelepiped shape having a long side 11L in the second direction B as in one embodiment of the present disclosure may generally include a plurality of heaters having a long axis extending in a direction of the long side 11L of the cooking chamber 11.

In a case in which the plurality of heaters are disposed on the upper surface 11*a* of the cooking chamber 11 and provide heat at different temperatures as in one embodiment of the present disclosure, a heat temperature that corresponds to heat provided from each heater may be provided to a position corresponding to each heater in the third direction C inside the cooking chamber 11.

Specifically, areas formed to receive heat at different temperatures may be divided from each other on the cooking surface 32 of the shelf 30.

A plurality of areas provided at positions respectively corresponding to the heaters may be formed in the third direction C on the cooking surface 32. The areas may be provided to directly receive heat at different temperatures generated from the heaters.

Accordingly, even when a plurality of objects to be cooked having different cooking temperatures are simultaneously put in the cooking chamber, the objects to be cooked may be cooked according to different cooking temperatures in a case in which the objects to be cooked are separately disposed in the plurality of areas of the cooking surface 32 which are divided from each other according to temperature differences. That is, in a case in which the objects to be cooked are placed in different areas, the objects to be cooked may be cooked at different temperatures.

Embodiments of the present disclosure take into consideration that since a plurality of heaters are disposed apart from each other in the first direction A, a plurality of areas that can receive heat at different temperatures may be divided from each other in the first direction A.

The cooking chamber 11 is provided in the rectangular parallelepiped shape having the long side 11L extending in the second direction B, and the shelf 30 corresponding to the cooking chamber 11 also includes the cooking surface 32 formed in a rectangular shape having a long side in the second direction B and a short side in the first direction A.

In a case in which the plurality of areas are divided from each other in the first direction A which is a direction of the short side of the cooking surface 32, a length at which the plurality of areas extend in the first direction A is inevitably short.

Accordingly, in the case of cooking an object to be cooked having a large volume, the object to be cooked may be disposed across a plurality of areas receiving heat at different temperatures, and thus a problem that some part of the object to be cooked is not cooked at a suitable temperature may occur.

Also, a user may observe each object to be cooked from outside the cooking apparatus 1 through the transparent member 2, and as any one of the plurality of objects to be cooked is disposed deep in the first direction A, an inconvenience may occur in observing the objects to be cooked being cooked.

In order to address such a problem, the plurality of heaters 210, 220, 230, and 240 of the cooking apparatus 1 according to one embodiment of the present disclosure may each be provided to include a long axis 200L extending in the first direction A, and the heaters 210, 220, 230, and 240 may be provided to be disposed apart from each other in the second direction B that corresponds to the direction in which the long side 11L of the cooking chamber 11 extends. Accordingly, a plurality of areas configured to receive heat at different temperatures may be divided from each other in the second direction B on the cooking surface 32 of the shelf 30.

Hereinafter, the plurality of heaters 210, 220, 230, and 240 according to one embodiment of the present disclosure and the plurality of areas divided from each other on the shelf 30 according to the plurality of heaters 210, 220, 230, and 240 will be described in detail.

Figure 4:
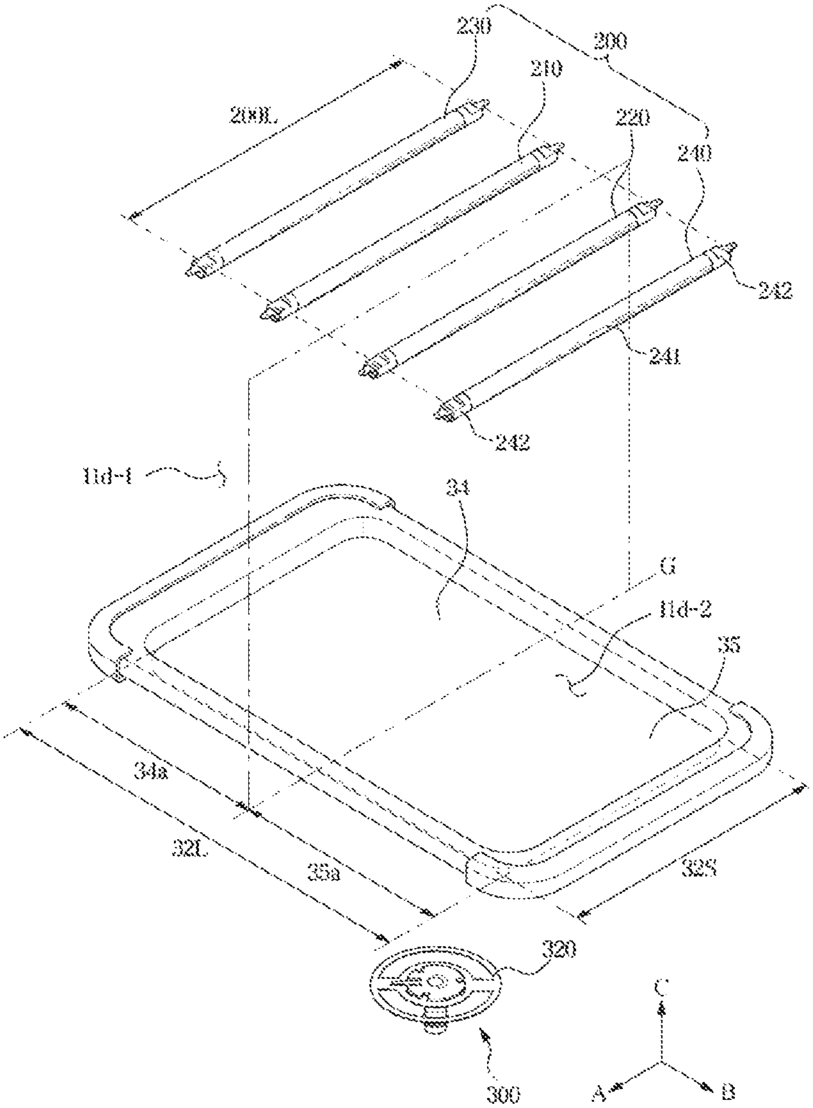
FIG. 4 illustrates a partial configuration of the cooking apparatus according to an embodiment of the present disclosure.

FIG. 4 illustrates a partial configuration of the cooking apparatus according to an embodiment of the present disclosure.

As described above, the plurality of heaters 210, 220, 230, and 240 may each be provided to include the long axis 200L extending in the first direction A, and the heaters 210, 220, 230, and 240 may be provided to be disposed apart from each other in the second direction B that corresponds to the long side 11L of the cooking chamber 11.

The plurality of heaters 210, 220, 230, and 240 may consist of four heaters including a first heater 210, a second heater 220, a third heater 230, and a fourth heater 240 as illustrated in FIG. 4, but the present disclosure is not limited thereto, and the plurality of heaters may only consist of the first heater 210 and the second heater 220 or may include more than the four heaters 210, 220, 230, and 240.

The first heater 210 may be disposed at one side in the second direction B, and the second heater 220 may be disposed at an opposite side of the first heater 210 in the second direction B.

Specifically, in the second direction B, the first heater 210 may be disposed at one side and the second heater 220 may be disposed at the other side with respect to a center line G of the cooking surface 32. The third heater 230 may be disposed at one side adjacent to the first heater 210, and the fourth heater 240 may be disposed at the other side adjacent to the second heater 220.

The first heater 210 and the third heater 230 may generate heat at the same temperature. Also, the second heater 220 and the fourth heater 240 may generate heat at the same temperature.

The first and third heaters 210 and 230 and the second and fourth heaters 220 and 240 may be provided so that heat at different temperatures is transferred. That is, with respect to the center line G, a temperature of heat transferred from one side of the center line G and a temperature of heat transferred from the other side may be provided to be different from each other.

A temperature itself of heat generated from the plurality of heaters 210, 220, 230, and 240 may be set to be the same, and during operation of the cooking apparatus 1, the cooking apparatus 1 may control the plurality of heaters 210, 220, 230, and 240 so that the first and third heaters 210 and 230 are continuously operated and the second and fourth heaters 220 and 240 are operated while repeating being turned on and off.

Conversely, the cooking apparatus 1 may control the plurality of heaters 210, 220. 230, and 240 so that the first and third heaters 210 and 230 are operated while repeating being turned on and off and the second and fourth heaters 220 and 240 are continuously operated.

Accordingly, a total temperature of heat generated from the first and third heaters 210 and 230 and a total temperature of heat generated from the second and fourth heaters 220 and 240 may be provided to be different from each other.

However, the present disclosure is not limited thereto, and a temperature itself of heat generated from the first and third heaters 210 and 230 and a temperature itself of heat generated from the second and fourth heaters 220 and 240 may be provided to be different from each other.

The shelf 30 may include a first cooking surface 34 and a second cooking surface 35 formed on the cooking surface 32. The first cooking surface 34 and the second cooking surface 35 may be divided from each other in the second direction B.

Specifically, the first cooking surface 34 may be formed at one side and the second cooking surface 35 may be formed at the other side with respect to the center line G.

The first cooking surface 34 may be disposed at a position that corresponds to the first and third heaters 210 and 230 in the third direction C. The second cooking surface 35 may be disposed at a position that corresponds to the second and fourth heaters 220 and 240 in the third direction C.

Since heat transferred from the first and third heaters 210 and 230 and heat transferred from the second and fourth heaters 240 are different from each other, a temperature of heat transferred to the first cooking surface 34 and a temperature of heat transferred to the second cooking surface 35 are different from each other. Therefore, objects to be cooked having different cooking temperatures may be separately placed on the first cooking surface 34 and the second cooking surface 35 and may be simultaneously cooked in a single cooking chamber 11.

Also, since different objects to be cooked can be placed in the left-right direction with respect to the first direction A which is the direction toward the front of the cooking apparatus 1, during cooking by the cooking apparatus 1, a user may easily observe cooking processes of the different objects to be cooked through the transparent member 22 in real time.

A short side 32S of the cooking surface 32 may be orthogonal to a long side 32L thereof and extend in a direction corresponding to the first direction A. In a case in which the plurality of heaters 210, 220, 230. and 240 have a long axis extending in a direction corresponding to the long side 321, of the cooking surface 32, the plurality of heaters 210, 220, 230, and 240 may be disposed apart from each other in the first direction A.

Here, in a case in which a direction in which the first cooking surface 34 and the second cooking surface 35 are divided from each other by the plurality of heaters 210, 220, 230, and 240 is provided as the first direction A, the first cooking surface 34 and the second cooking surface 35 do not have a sufficient length in one direction.

However, since the plurality of heaters 210, 220, 230, and 240 of the cooking apparatus 1 according to one embodiment of the present disclosure are disposed apart from each other in the second direction B such that the first cooking surface 34 and the second cooking surface 35 are divided from each other in the second direction B, and the long side 32L of the cooking surface 32 extends in the second direction B, the first cooking surface 34 and the second cooking surface 35 may have a sufficient length in one direction.

That is, assuming that a length of the first cooking surface 34 in the second direction B is a first length 34*a* and a length of the second cooking surface 35 in the second direction B is a second length 35*a*, the first length 34*a* and the second length 35*a* may be provided to have a length that allows approximately the whole object to be cooked to be placed within the first cooking surface 34 or the second cooking surface 35.

In other words, the first length 34*a* and the second length 35*a* may be formed longer than a length of the short side 32S of the cooking surface 32 divided in half and may divide the cooking surface 32 into the first cooking surface 34 and the second cooking surface 35 each having a quadrangular shape close to a substantially square shape. That is, the cooking surface 32 may be efficiently divided.

Accordingly, areas of the first cooking surface 34 and the second cooking surface 35 on which different objects to be cooked may be placed may be formed as 34*a*×32S and 35*a*×32S, respectively. The first length 34*a* or the second length 35*a* may be provided as a length substantially corresponding to the length of the short side 32S of the cooking surface 32. Accordingly, a cross-sectional shape of the first cooking surface 34 and the second cooking surface 35 may be provided to be a substantially square shape, and an object to be cooked may he easily placed within the first cooking surface 34 or the second cooking surface 35.

The present disclosure is not limited thereto, and the first length 34*a* or the second length 35*a* may be formed to have a length different from the length of the short side 32S of the cooking surface 32, and a cross-sectional shape of the first cooking surface 34 and the second cooking surface 35 may be provided to be a rectangular shape.

However, a ratio of the first length 34*a* or the second length 35*a* to the length of the short side 32S of the cooking surface 32 (34*a*/32S or 35*a*/32S) may be provided to be larger than a ratio of a length of the first cooking surface 34 or the second cooking surface 35, when the first and second cooking surfaces 34 and 35 are divided from each other in the first direction A, to the length of the long side 32L of the cooking surface 32.

Hereinafter, a technical feature in which a space inside the cooking chamber 11 is efficiently divided in a case in which a plurality of objects to be cooked are simultaneously cooked in the cooking chamber 11 will be described.

Figure 5:
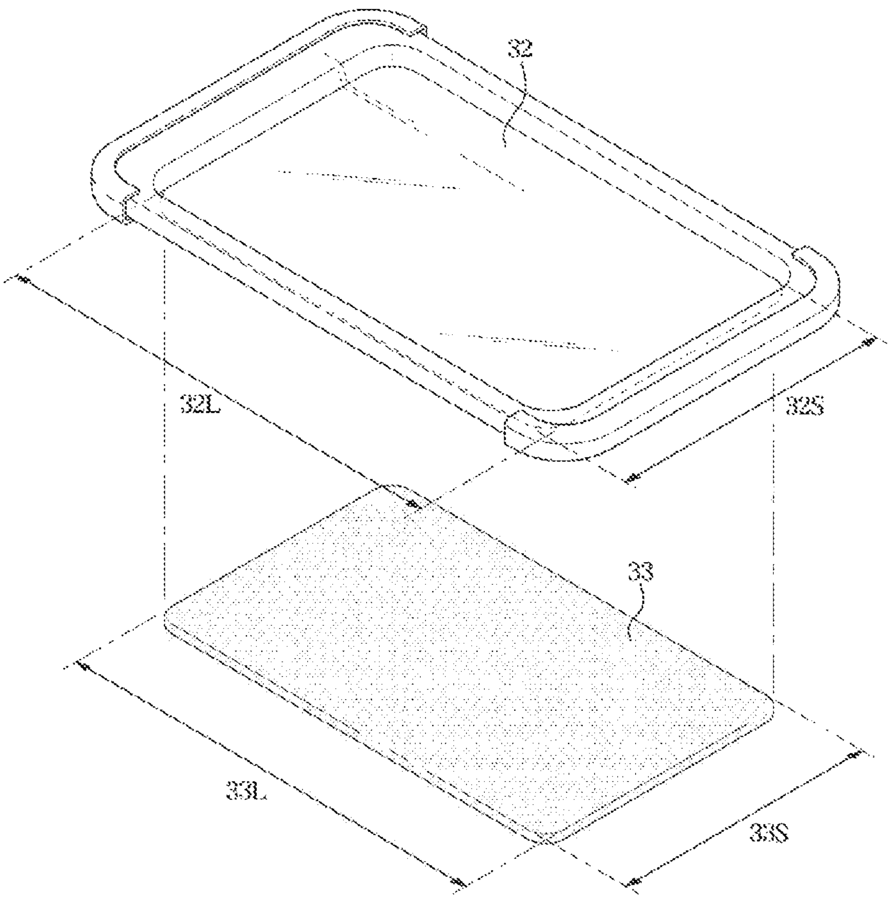
FIG. 5 illustrates an exploded perspective view of a shelf of the cooking apparatus according to an embodiment of the present disclosure.
Figure 6:
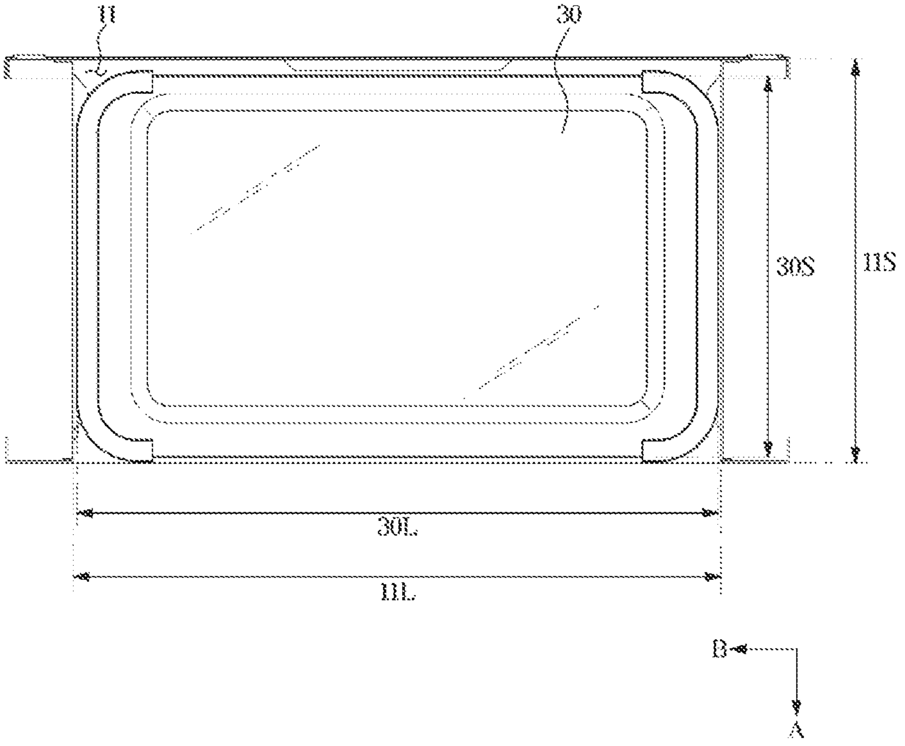
FIG. 6 illustrates a plan view of the inside of a cooking chamber of the cooking apparatus according to an embodiment of the present disclosure.

FIG. 5 illustrates an exploded perspective view of a shelf of the cooking apparatus according to an embodiment of the present disclosure. FIG. 6 illustrates a plan view of the inside of a cooking chamber of the cooking apparatus according to an embodiment of the present disclosure. As illustrated in FIGS. 3 and 4 which have been described above, the shelf 30 may divide the cooking chamber 11 into the first cooking area 11*d* and the second cooking area 11*e* as described above.

The first cooking area 11*d* may be divided into areas having different cooking temperatures in the second direction B, which is the left-right direction, by the first and third heaters 210 and 230 and the second and fourth heaters 220 and 240 that emit heat at different temperatures.

Specifically, the first cooking area 11*d* may include a first area 11*d*-1 that corresponds to the first and third heaters 210 and 230 in the third direction C and a second area 11*d*-2 that corresponds to the second and fourth heaters 220 and 240 in the third direction C.

The first area 11*d*-1 may be provided to correspond to the first cooking surface 34 in the third direction C, and the second area 11*d*-2 may be provided to correspond to the second cooking surface 35.

That is, at one side in the second direction B with respect to the center line G of the cooking surface 32, the first and third heaters 210 and 230, the first cooking surface 34 corresponding thereto, and the first area 11*d*-1 having a constant temperature due to the first and third heaters 210 and 230 and the first cooking surface 34 may be disposed.

At the other side in the second direction B with respect to the center line G of the cooking surface 32, the second and fourth heaters 220 and 240, the second cooking surface 35 corresponding thereto, and the second area 11*d*-2 having a constant temperature, different from the constant temperature of the first area 11*d*-1, due to the second and fourth heaters 220 and 240 and the second cooking surface 35 may be disposed.

Accordingly, a plurality of different objects to be cooked may be simultaneously cooked in the first area 11*d*-1 of the first cooking area 11*d*, the second area 11*d*-2 of the first cooking area 11*d*, and the second cooking area 11*e*.

In a case in which an object to be cooked that is cooked in the first area 11*d*-1 of the first cooking area 11*d* is referred to as a first object to be cooked, an object to be cooked that is cooked in the second cooking area 11*e* is referred to as a second object to be cooked, and an object to be cooked that is cooked in the second area 11*d*-2 of the first cooking area 11*d* is referred to as a third object to be cooked, the first, second, and third objects to be cooked may be cooked at different external temperatures and cooked using high-frequency waves.

The first object to be cooked may be cooked by heat supplied from the first and third heaters 210 and 230 and external heat supplied from the heat generator 33.

The second object to be cooked may be cooked by high frequency waves from the second heating source 300.

The third object to be cooked may be cooked by heat supplied from the second and fourth heaters 220 and 240 and external heat supplied from the heat generator 33.

That is, the three objects to be cooked having different cooking methods or different cooking temperatures can be simultaneously cooked inside a single cooking chamber 11.

However, the present disclosure is not limited thereto, and more than three objects to be cooked having different cooking methods or different cooking temperatures can be simultaneously cooked.

That is, although not illustrated in the drawings, in one example, the first and third heaters 210 and 230 may be provided to generate heat at different temperatures. Accordingly, the first heater 210, the third heater 230, and the second and fourth heaters 220 and 240 may be provided to provide heat at different temperatures, and the first cooking area 11*d* of the cooking chamber 11 may be divided into three areas that maintain different cooking temperatures.

Additionally, in a case in which the second and fourth heaters 220 and 240 are provided to generate heat at different temperatures, the first cooking area 11*d* of the cooking chamber 11 may be divided into a plurality of areas due to the plurality of heaters 210, 220, 230, and 240.

Also, the present disclosure is not limited thereto, and the plurality of heaters may be provided as more than four heaters. With an increase in the number of the plurality of heaters, the number of areas having different temperatures inside the first cooking area 11*d* of the cooking chamber 11 may be further increased.

However, in the present embodiment, the case in which the first cooking area 11*d* of the cooking chamber 11 is divided into the first area 11*d*-1 and the second area 11*d*-2 is described as an example.

The shelf 30 may be disposed closer to the first heating source 200 than to the second heating source 300 in the third direction C which is the vertical direction.

That is, a distance h1 from the cooking surface 32 to the plurality of heaters 210, 220, 230, and 240 may be formed shorter than a distance h2 from the cooking surface 32 to the lower surface 11*b* of the cooking chamber 11.

This is to efficiently divide the first cooking area 11*d* into the first area 11*d*-1 and the second area 11*d*-2.

As described above, the first area 11*d*-1 and the second area 11*d*-2 may be divided from each other on the basis of a difference between temperatures maintained in the areas. That is, the areas may be divided from each other on the basis of a difference between a temperature of heat received from the first and third heaters 210 and 230 and a temperature of heat received from the second and fourth heaters 220 and 240.

Here, in a case in which the distance h1 between the plurality of heaters 210, 220, 230, and 240 and the cooking surface 32 is formed to be large, a distance between an object to be cooked disposed on the cooking surface 32 and the plurality of heaters 210, 220, 230, and 240 may be formed to be large.

Accordingly, heat generated from the first and third heaters 210 and 230 and heat generated at a different temperature from the second and fourth heaters 220 and 240 may be transferred to different areas 11*d*-1 and 11*d*-2, respectively, and heat at a cooking temperature different from a set cooking temperature may be transferred to each object to be cooked.

That is, as the distance between each of the heaters 210, 220, 230, and 240 and the object to be cooked is larger, heat at a temperature different from a temperature of heat transferred from each of the heaters 210, 220, 230, and 240 is transferred to the object to be cooked, and thus, the object to be cooked may be cooked at a temperature different from an optimum cooking temperature.

Therefore, the distance hi between the plurality of heaters 210, 220, 230, and 240 and the cooking surface 32 may be provided as a distance at which heat generated from each of the heaters 210, 220, 230, and 240 does not affect another object to be cooked.

The distance h1 between the plurality of heaters 210, 220, 230, and 240 and the cooking surface 32 may be formed so that heat generated from the first and third heaters 210 and 230 is not transferred to the second area 11*d*-2 and, conversely, heat generated from the second and fourth heaters 220 and 240 is not transferred to the first area 11*d*-1.

That is, for heat generated from each of the heaters 210, 220, 230, and 240 to be mostly transferred in the third direction C and not be transferred in the second direction B, the distance hi from the cooking surface 32 to the plurality of heaters 210, 220, 230, and 240 may be formed shorter than the distance h2 from the cooking surface 32 to the lower surface 11*b* of the cooking chamber 11, so that the distance between the plurality of heaters 210, 220, 230, and 240 and the cooking surface 32 is formed to be short.

To this end, the distance h1 from the cooking surface 32 to the plurality of heaters 210, 220, 230, and 240 may be provided to be 100 mm or less.

In a case in which the distance h1 from the cooking surface 32 to the plurality of heaters 210, 220, 230, and 240 is formed in the above numerical range, the first heater 210 and the second heater 220 which are disposed adjacent to each other and generate heat at different temperatures may supply heat at different temperatures to the areas 11*d*-1 and 11*c*-2 without a temperature interference between the first heater 210 and the second heater 220.

The cooking apparatus 1 may include a heat reflection member 16 provided so that heat generated from the first and third heaters 210 and 230 is transferred to the first area 11*d*-1 and heat generated from the second and fourth heaters 220 and 240 is transferred to the second area 11*d*-2.

The heat reflection member 16 may be disposed above the plurality of heaters 710, 220, 230, and 240 in the third direction C.

The heat reflection member 16 may be provided in a shape that surrounds an upper side of each of the heaters 210, 220, 230, and 240 in the third direction C.

The heat reflection member 16 may guide heat generated from each of the heaters 210, 220, 230, and 240 so that heat radiated from each of the heaters 210, 220, 230, and 240 is reflected in the third direction C and heat generated from each of the heaters 210, 220, 230, and 240 moves in the third direction C.

Accordingly, heat generated from the first and third heaters 210 and 230 may be concentrated on the first area 11*d*-1, and heat generated from the second and fourth heaters 220 and 240 may be concentrated on the second area 11*d*-2.

Accordingly, heat generated from the first heater 210 and heat generated from the second heater 220 disposed adjacent to the first heater 210 may easily move in the third direction C, and thus the first area 11*d*-1 and the second area 11*d*-2 may be easily divided from each other.

As illustrated in FIG. 5, the cooking surface 32 and the heat generator 33 of the shelf may be provided to have areas that substantially correspond to each other in the third direction C. Also, the cooking surface 32 and the heat generator 33 may be disposed at positions that correspond to each other in the third direction C.

The long side 32L of the cooking surface 32 and a long side 331L of the heat generator 33 may be provided to have substantially the same length and may be provided to correspond to each other in the third direction C.

The short side 32S of the cooking surface 32 and a short side 33S of the heat generator 33 may be provided to have substantially the same length and may be provided to correspond to each other in the third direction C.

Accordingly, heat can be uniformly supplied to the entire area of the cooking surface 32 by the heat generator 33, and thus heat can be uniformly supplied to an object to be cooked placed on the cooking surface 32.

From an upper side in the third direction C with respect to an object to be cooked, heat may be uniformly supplied by the plurality of heaters 210, 220, 230, and 240, and from a lower side in the third direction C with respect to the object to be cooked, heat may be uniformly supplied by the heat generator 33. In this way, the object to be cooked can be cooked by receiving uniform heat throughout.

Due to the heat generator 33 and the cooking surface 32 being formed to have substantially the same area, most of the heat generated from the heat generator 33 may be transferred to the cooking surface 32, and thus heat may be efficiently provided to the object to be cooked.

As illustrated in FIG. 6, an area of the shelf 30 in the third direction C may be provided to be about 0.9 to 1 times an area of the cooking chamber 11 in the third direction C.

The long side 11L of the cooking chamber 11 and a long side 30L of the shelf 30 may be provided to have substantially the same length and may be provided to correspond to each other in the third direction C.

A short side 11S of the cooking chamber 11 may be provided to have a length substantially the same as or longer than a short side 30S of the shelf 30 and may be provided to correspond thereto in the third direction C.

Accordingly, transfer of heat generated by the first heating source 200 in the first cooking area 11*d* to the second cooking area 11*e* may be partially blocked. Also, movement of high-frequency waves oscillated from the second cooking area 11*e* to the first cooking area 11*d* may be partially blocked.

Therefore, cooking may be independently performed in the first cooking area 11*d* and the second cooking area 11*e*.

The second heating source 300 may include a stirrer 320 provided to mix high-frequency waves oscillated from the magnetron 310 and uniformly radiate the mixed high-frequency waves toward the cooking chamber 11 (see FIG. 3).

The stirrer 320 may be provided in a circular ape having a cut portion formed therein (see FIG. 4).

The stirrer 320 may be provided to, by rotating, radiate high-frequency waves heading toward only one side of the cooking chamber 11 in various directions so that the high-frequency waves reach the entire inner side of the cooking chamber 11.

In the cooking apparatus 1 according to one embodiment of the present disclosure, as described above, the shelf 30 having a cross-sectional area substantially corresponding to a cross-sectional area of the cooking chamber 11 in the second direction B is disposed inside the cooking chamber 11 and may limit movement of some high-frequency waves inside the cooking chamber 11.

Accordingly, since high-frequency waves are concentrated on one side of the cooking chamber 11 and energy is not evenly transferred throughout the entire cooking chamber 11, a problem may occur in which an object to be cooked disposed in the second cooking area 11*e* is not evenly cooked, a portion of the heat generator 33 is not heated due to the high-frequency waves not uniformly reaching the heat generator 33, or a portion of the cooking chamber 11 is overheated.

In particular, in a case in which an area inside the cooking chamber 11 is small, a problem may occur in terms of stability of the cooking apparatus 1 in response to high-frequency waves being concentrated on a partial area inside the cooking chamber 11.

Accordingly, the stirrer 320 may be provided to have a diameter d of a predetermined length or more to evenly mix high-frequency waves and uniformly radiate the high-frequency waves toward the inside of the cooking chamber 11.

As the diameter d of the stirrer 320 is provided to be the predetermined length or more, high-frequency waves oscillated from the magnetron 310 may be easily mixed. In a case in which the capacity of the cooking chamber 11 is provided to be about 20 L to 30 L, the diameter d of the stirrer 320 may be provided to be 150 mm or more.

As described above, the stirrer 320 is provided in a circular shape. A circumferential portion of the stirrer 320 may be provided in a non-cut ring shape. At least a portion of the stirrer 320 is cut out, and as the stirrer 320 rotates, high-frequency waves passing through the stirrer 320 are mixed. Since the circumferential portion of the stirrer 320 is provided in the ring shape, the high-frequency waves can be more uniformly radiated toward the inside of the cooking chamber 11.

Also, the stirrer 320 may be provided so that a distance h3 between the circumferential portion of the stirrer 320 and an installation surface 11*f* on which the stirrer 320 is installed in the third direction C has a predetermined length. In the case in which the capacity of the cooking chamber 11 is provided to be about 20 L to 30 L, the distance h3 from the installation surface 11*f* to the circumferential portion of the stirrer 320 may be provided to be around 30 mm.

Hereinafter, a cooking apparatus 1 according to another embodiment of the present disclosure will be described. Except for a technical feature of distinguishing between first and second areas 11*d*-1 and 11*d*-2 which will be described below, features of the cooking apparatus 1 according to another embodiment of the present disclosure are the same as those of the cooking apparatus 1 described above, and thus description of overlapping contents will be omitted.

Figure 7:
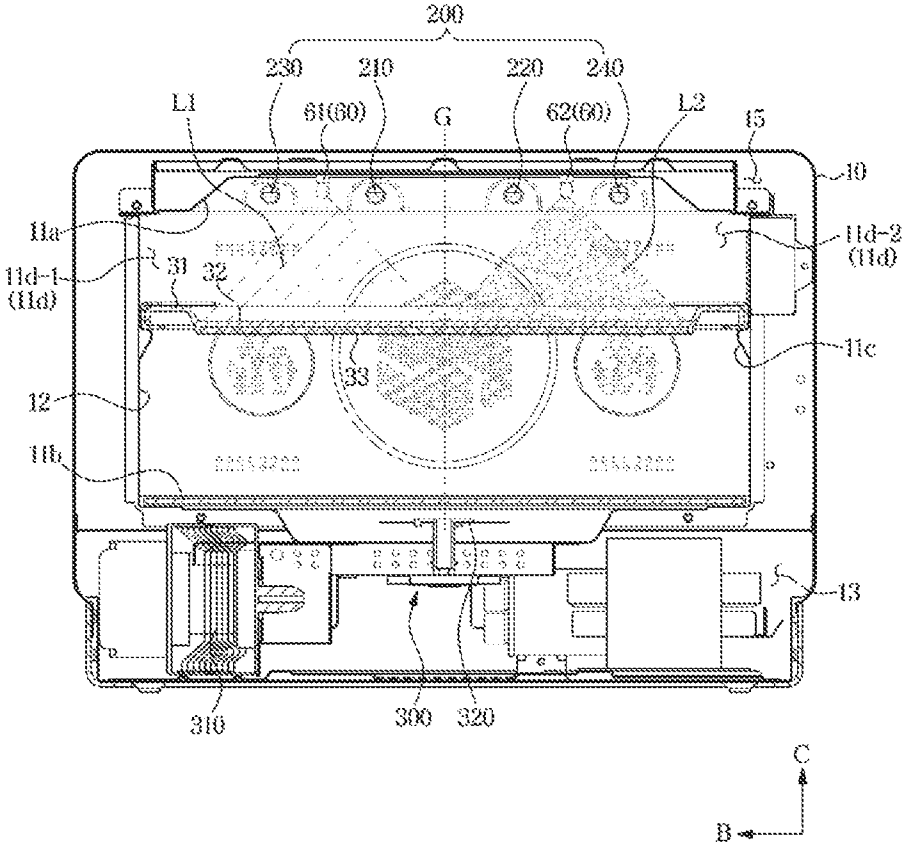
FIG. 7 illustrates a cross-sectional view of a cooking apparatus according to an embodiment of the present disclosure.
Figure 8:
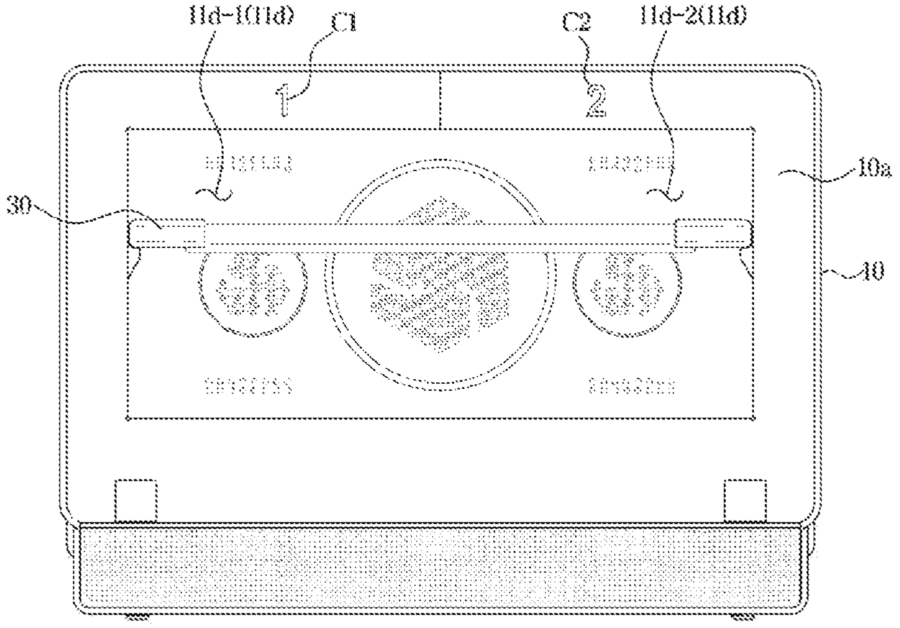
FIG. 8 illustrates a front view of a state in which a door of the cooking apparatus open according to an embodiment of the present disclosure.

FIG. 7 illustrates a cross-sectional view of the cooking apparatus according to an embodiment of the present disclosure. FIG. 8 illustrates a front view of a state in which a door of the cooking apparatus is open according to an embodiment of the present disclosure is open.

As illustrated in FIG. 7, the cooking apparatus 1 may include a light source 60 configured to radiate light L1 and light L2 having different colors o the first area 11*d*-1 and the second area 11*d*-2 to allow a user to visually recognize the first area 11*d*-1 and the second area 11*d*-2.

The light source 60 may include a first light source 61 configured to radiate the light L1 to the first area 11*d*-1 and a second light source 62 configured to radiate the light L2 to the second area 11*d*-2.

The first and second light sources 61 and 62 may be provided to be disposed in the first area 11*d*-1 and the second area 11*d*-2, respectively. However, the present disclosure is not limited thereto, and the light source 60 may be provided to radiate light of different colors to the first area 11*d*-1 and the second area 11*d*-2 through a single light.

Due to the lights L1 and L2 of different colors radiated by the first and second light sources 61 and 62, the user may easily recognize the first area 11*d*-1 and the second area 11*d*-2 and separately place objects to be cooked having different cooking temperatures on the areas 11*d*-1 and 11*d*-2.

The shelf 30 may be provided in a substantially rectangular shape and may be provided in a shape that is substantially vertically symmetrical in the second direction B.

Accordingly, in a case in which a user separately places different objects to be cooked on one side and the other side of the shelf 30 and inserts the shelf 30 into the cooking chamber 11 to cook the objects to be cooked, the user may get confused on which of the first area 11*d*-1 and the second area 11*d*-2 is the one side in the second direction B.

That is, the user may separately place objects to be cooked having different cooking temperatures on the first cooking surface 34 and the second cooking surface 35 and insert the shelf 30 into the cooking chamber 11 to cook the objects to be cooked, and here, the user may place an object to be cooked supposed to be placed on the first cooking surface 34 on the second cooking surface 35 or place an object to be cooked supposed to be placed on the second cooking surface 35 on the first cooking surface 34 or may insert the shelf 30 upside down in the cooking chamber 11.

In order to address such problems, the light sources 61 and 62 may radiate different lights L1 and L2 and may visually guide the user that an area to which a first light L1 of a specific color is radiated is the first area 11*d*-1 and visually guide the user to place the first cooking surface 34 of the shelf 30 in the first area 11*d*-1.

Also, the light sources 61 and 62 may visually guide the user that an area to which a second light L2 of a specific color, different from the color of the first light L1, is radiated is the second area 11*d*-2 and visually guide the user to place the second cooking surface 35 of the shelf 30 in the second area 11*d*-2.

The light source 60 may be provided to radiate light while the door 20 is open or while cooking is performed. Accordingly, the user may easily check the positions of the first and second areas 11*d*-1 and 111*d*-2 while the user inserts the shelf 30 into the cooking chamber 11 or while cooking is performed. Due to the light source 60, the user may insert the shelf 30 into the cooking chamber 11 in a direction in which the first cooking surface 34 and the second cooking surface 35 are placed in the first area 11*d*-1 and the second area 11*d*-2, respectively.

Different from the above embodiment of the present disclosure, temperatures of heat transferred from the plurality of heaters 210, 220, 230, and 240 may be controlled to be different from each other, and the first cooking area 11 d configured to receive heat at three or more different temperatures may be divided into three or more areas, or in a case in which the plurality of heaters 210, 220, 230, and 240 are provided as five or more heaters and the first cooking area 11*d* is divided into three or more areas, as many light sources 60 as the number of areas into which the first cooking area 11*d* is divided may be provided, or the light source 60 may show as many colors as the number of areas into which the first cooking area 11*d* is divided and indicate the areas with lights of different colors.

As illustrated in FIG. 8, the housing 10 may include a front surface 10*a* exposed to the outside in the first direction A while the door 20 is open.

The front surface 10*a* may include an opening open in the first direction A, and the user may place the shelf 30 and food inside the cooking chamber 11 through the opening.

Indicators C1 and C2 provided to allow the user to visually distinguish between the first area 11*d*-1 and the second area 11*d*-2 may be formed on the front surface 10*a* of the housing 10.

For example, a first indicator C1 may indicate a position that corresponds to the first and third heaters 210 and 230 and the first area 11*d*-1 formed by the first and third heaters 210 and 230 in the first direction A.

The second indicator C2 may indicate a position that corresponds to the second and fourth heaters 220 and 240 and the second area 11*d*-2 formed by the second and fourth heaters 220 and 240 in the first direction A.

The user may visually check the first and second indicators C1 and C2 and may insert the shelf 30 into the cooking chamber 11 so that the first cooking surface 34 is disposed at a position corresponding to the first indicator C1 in the first direction A and the second cooking surface 35 is disposed at a position corresponding to the second indicator C2 in the first direction A.

That is, the indicators C1 and C2 may visually guide the user to insert the shelf 30 into the cooking chamber 11 in the direction in which the first cooking surface 34 is disposed in the first area 11*d*-1 and the second cooking surface 35 is disposed in the second area 11*d*-2.

Hereinafter, a cooking apparatus 1 according to another embodiment of the present disclosure will be described. Except for a technical feature of distinguishing between first and second areas 11*d*-1 and 11*d*-2 which will be described below, features of the cooking apparatus 1 according to another embodiment of the present disclosure are the same as those of the cooking apparatus 1 described above, and thus description of overlapping contents will be omitted.

Figure 9:
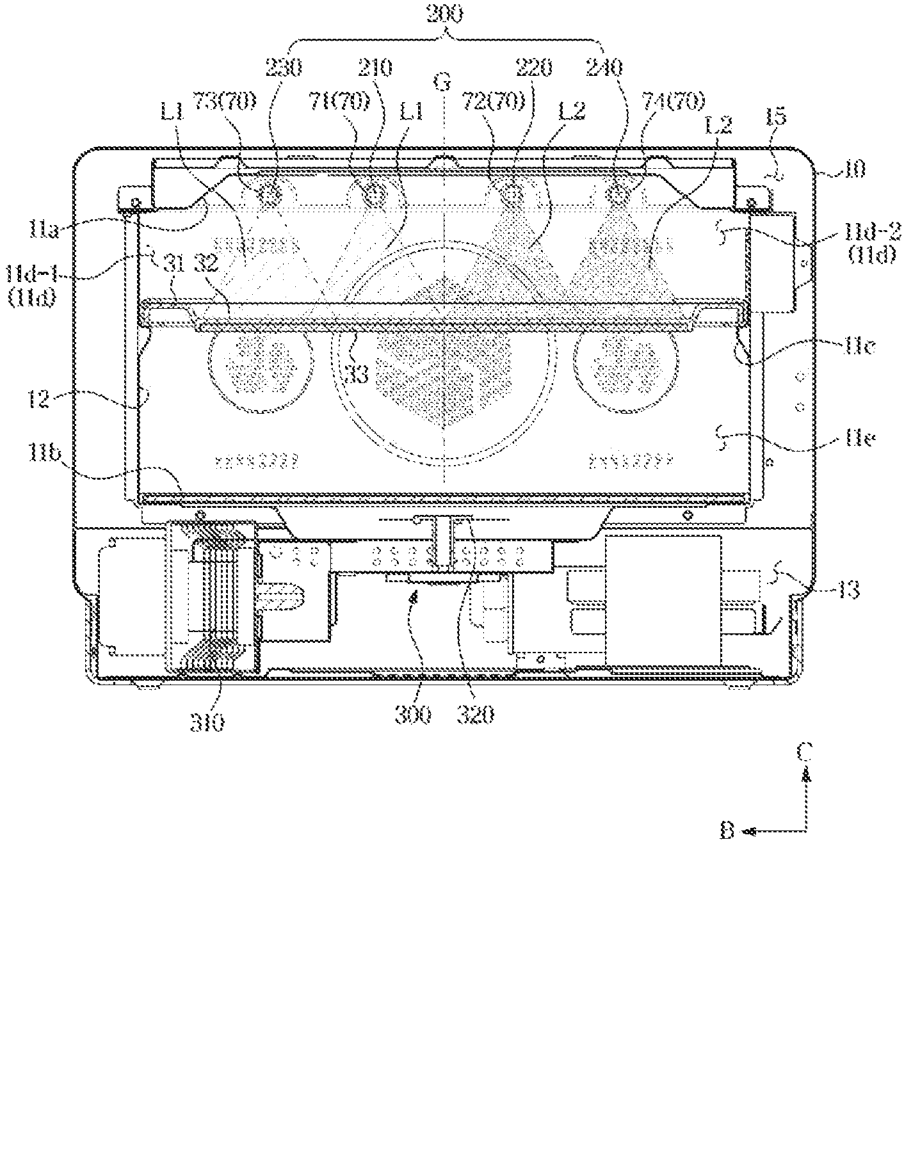
FIG. 9 illustrates a cross-sectional view of a cooking apparatus according to an embodiment of the present disclosure.

FIG. 9 illustrates a cross-sectional view of a cooking apparatus according to an embodiment of the present disclosure.

The plurality of heaters 210, 220, 230, and 240 may include a color filter 70 configured to show a specific color due to heat generated by the plurality of heaters 210, 220, 230, and 240.

The color filter 70 may be disposed on an outer circumferential surface of each of the plurality of heaters 210, 220, 230, and 240.

The first heater 210 may include a first color filter 71, the second heater 220 may include a second color filter 72, the third heater 230 may include a third color filter 73, and the fourth heater 240 may include a fourth color filter 74.

In a case in which the first cooking area 11*d* is divided by the first and third heaters 210 and 230 and the second and fourth heaters 220 and 240 as in the above embodiment of the present disclosure, the first and third color filters 71 and 73 may be provided to show light L1 of the same color, and the second and fourth color filters 72 and 74 may be provided to show light L2 of the same color.

Also, different from the above embodiment of the present disclosure, in a case in which the heaters 210, 220, 230, and 240 generate heat at different temperatures and the first cooking area 11*d* is divided into three or more areas, the color filters 71, 72, 73, and 74 may be provided to show light of different colors.

The user may visually check lights L1 and L2 of different colors shown by the color filter 70 and may insert the shelf 30 into the cooking chamber 11 so that the first cooking surface 34 is disposed at a position that corresponds to a position to which the first light L1 of a specific color is radiated in the first direction A, and the second cooking surface 35 is disposed at a position that corresponds to a position to which the second light L2 of a specific color, different from the color of the first light Li, is radiated in the first direction A.

That is, the color filter 70 may visually guide the user to insert the shelf 30 into the cooking chamber 11 in the direction in which the first cooking surface 34 is disposed in the first area 11*d*-1 and the second cooking surface 35 is disposed in the second area 11*d*-2.

Hereinafter, a cooking apparatus 1 according to another embodiment of the present disclosure will be described. Except for a technical feature of distinguishing between first and second areas 11*d*-1 and 11*d*-2 which will be described below, features of the cooking apparatus 1 according to another embodiment of the present disclosure are the same as those of the cooking apparatus 1 described above, and thus description of overlapping contents will be omitted.

Figure 10:
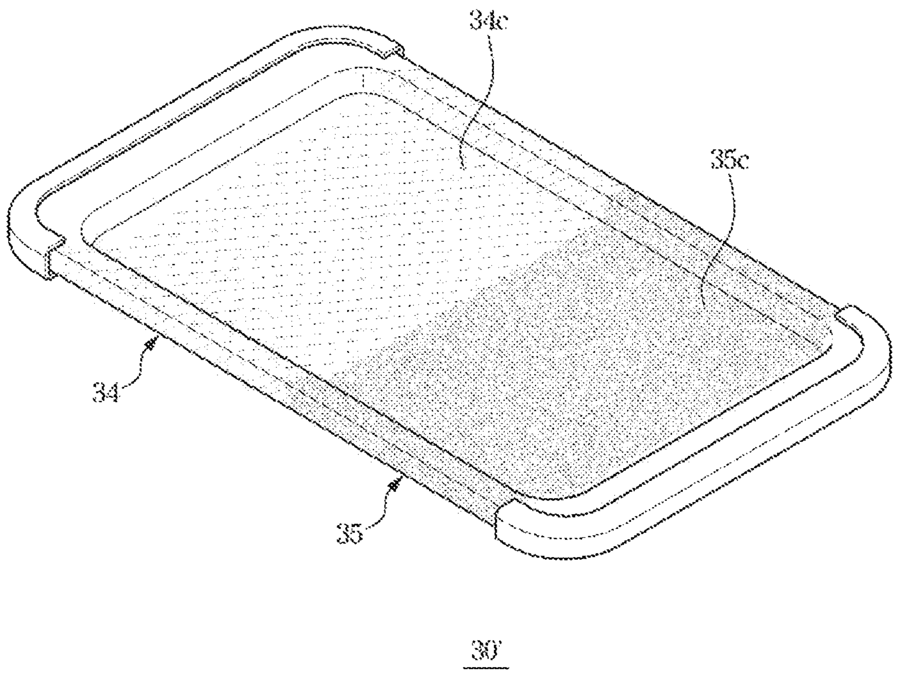
FIG. 10 illustrates a shelf of the cooking apparatus according to an embodiment of the present disclosure.
Figure 11:
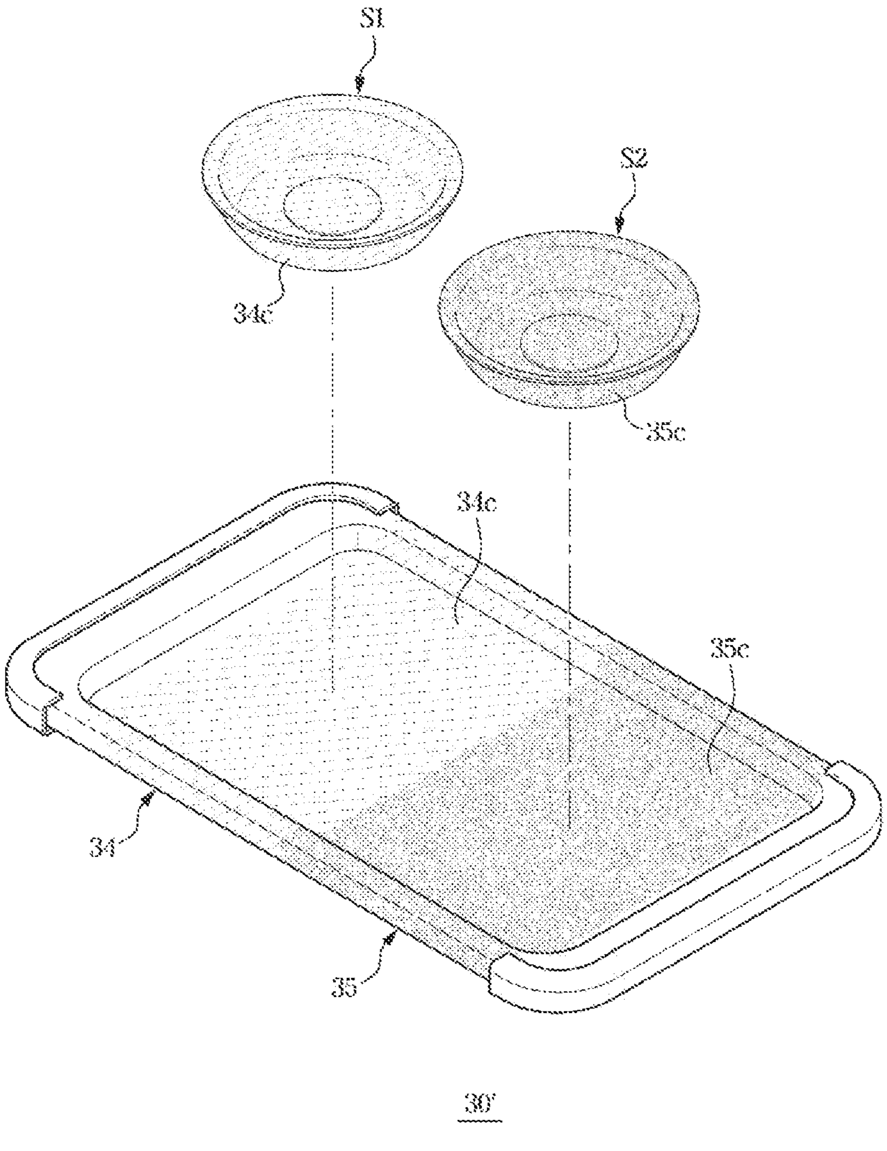
FIG. 11 illustrates the shelf and a partial configuration of the cooking apparatus according to an embodiment of the present disclosure.

FIG. 10 illustrates a shelf of the cooking apparatus according to an embodiment of the present disclosure. FIG. 11 illustrates the shelf and a partial configuration of the cooking apparatus according to an embodiment of the present disclosure.

A shelf 30 may include a first indication area 34*c* formed on at least a portion of the first cooking surface 34. The first indication area 34*c* is an area in which a specific color is shown. The shelf 30 may include a second indication area 35*c* formed on at least a portion of the second cooking surface 35. The second indication area 35*c* is an area in which a specific color, different from the color shown in the first indication area 34*c*, is shown.

Since the first and second indication areas 34*c* and 35*c* show different colors, the user may visually easily distinguish between the first and second cooking surfaces 34 and 35 due to the first and second indication areas 34*c* and 35*c*.

The first indication area 34*c* may visually guide the user so that the user easily places an object to be cooked that is cooked in the first area 11*d*-1 on the first cooking surface 34. The second indication area 35*c* may visually guide the user so that the user easily places an object to be cooked that is cooked in the second area 11*d*-2 on the second cooking surface 35.

The user may insert the shelf 30 into the cooking chamber 11 so that the first indication area 34*c* is disposed in the first area 11*d*-1 in the first direction A and the second indication area 35*c* is disposed in the second area 11*d*-2 in the first direction A.

As illustrated in FIG. 11, the shelf 30 may include a first container S1 provided to hold a first object to be cooked that needs to be cooked in the first area 11*d*-1 and a second container S2 provided to hold a third object to be cooked that needs to be cooked in the second area 11*d*-2.

In a case in which an object to be cooked is formed as a liquid or a plurality of granules, the object to be cooked may be difficult to hold within the shelf 30. Also, due to a shape change of an object to be cooked, such as liquefaction of a solid, that occurs as the object to be cooked is cooked, the object to be cooked may be difficult to hold within the shelf 30.

In order to facilitate cooking of such objects to be cooked, the shelf 30 may further include the containers S1 and S2 configured to hold an object to be cooked.

The first container S1 may include the first indication area 34*c* formed on the first container S1. The second container S2 may include the second indication area 35*c* formed on the second container S2.

That is, the first indication area 34*c* may be formed on the first container S1 and the first cooking surface 34 so that the same color is shown thereon, and the second indication area 35*c* may be formed on the second container 52 and the second cooking surface 35 so that the same color is shown thereon.

Although not illustrated in the drawings, the first cooking surface 34 may include a first seating portion (not illustrated) provided so that the first container S1 is easily seated thereon. The first seating portion (not illustrated) may be provided in the shape of a hole that is formed in the first cooking surface 34 or may be provided in the shape of a support step to allow the first container Si to be seated on the first cooking surface 34.

Also, although not illustrated in the drawings, the second cooking surface 35 may include a second seating portion (not illustrated) provided so that the second container S2 is easily seated thereon. The second seating portion (not illustrated) may be provided in the shape of a hole that is formed in the second cooking surface 35 or may be provided in the shape of a support step to allow the second container 52 to be seated on the second cooking surface 35.

Accordingly, the first indication area 34*c* may visually guide the user to put a first object to be cooked, which needs to be cooked in the first area 11*d*-1, in the first container S1 and mount the first container S i on the first cooking surface 34 so that the first object to be cooked is cooked in the first area 11*d*-1.

The second indication area 35*c* may visually guide the user to put a third object to be cooked, which needs to be cooked in the second area 11*d*-2, in the second container S2 and mount the second container S2 on the second cooking surface 35 so that the third object to be cooked is cooked in the second area 11*d*-2.

Also, different from the above embodiment of the present disclosure, in a case in which the first cooking area 11*d* is divided into three or more areas, as many indication areas as the number of areas into which the first cooking area 11*d* is divided, which is three or more, may be formed so that an object to be cooked may be placed in each area.

Also, different from the above embodiment of the present disclosure, in a case in which the first cooking area 11*d* is divided into three or more areas, as many containers as the number of areas into which the first cooking area 11*d* is divided, which is three or more, may be formed so that the containers allow an object to be cooked to be placed in each area.

Figure 12:
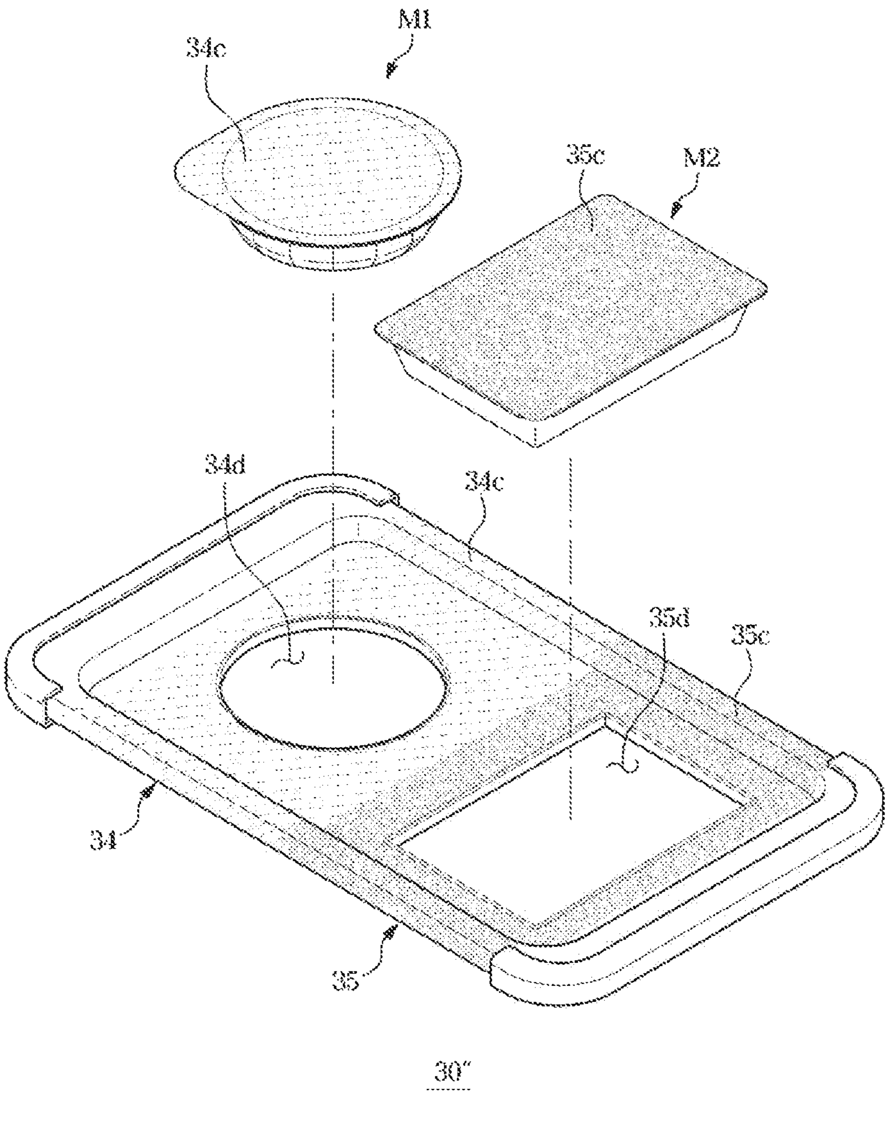
FIG. 12 illustrates a shelf and a partial configuration of the cooking apparatus according to an embodiment of the present disclosure.
Figure 13:
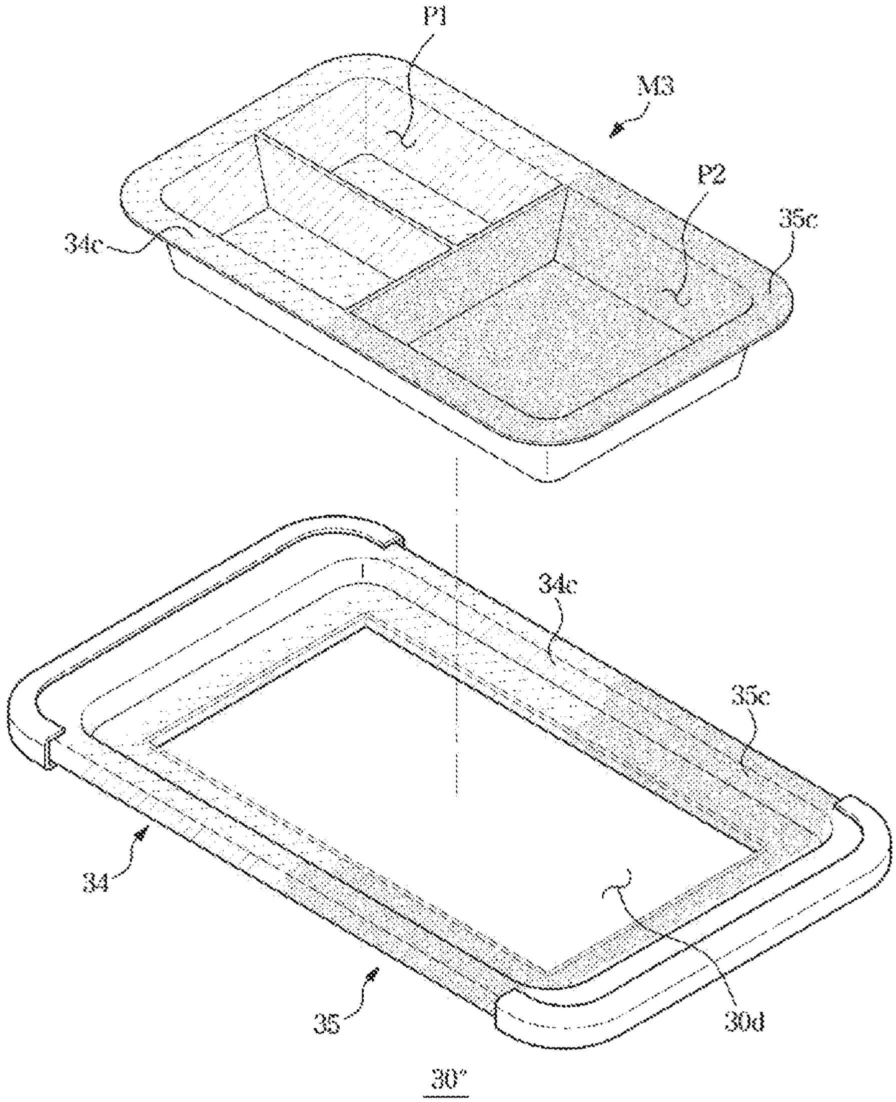
FIG. 13 illustrates a shelf and a partial configuration of the cooking apparatus according to an embodiment of the present disclosure.

Hereinafter, a cooking apparatus 1 according to another embodiment of the present disclosure will he described. Except for a technical feature of distinguishing between first and second areas 11*d*-1 and 11*d*-2 which will be described below, features of the cooking apparatus 1 according to another embodiment of the present disclosure are the same as those of the cooking apparatus 1 described above, and thus description of overlapping contents will be omitted. FIG. 12 illustrates a shelf and a partial configuration of the cooking apparatus according to an embodiment of the present disclosure. FIG. 13 illustrates a shelf and a partial configuration of the cooking apparatus according to an embodiment of the present disclosure.

A shelf 30' may include a first indication area 34*c* formed on at least a portion of the first cooking surface 34. The first indication area 34*c* is an area in which a specific color is shown.

The shelf 30' may include a second indication area 35*c* formed on at least a portion of the second cooking surface 35. The second indication area 35*c* is an area in which a specific color, different from the color shown in the first indication area 34*c,* is shown.

The shelf 30' may include a first seating portion 34*d* on which a first home meal replacement (HMR) to be cooked M1 that needs to be cooked in the first area 11*d*-1 is seated.

The shelf 30' may include a second seating portion 35*d* on which a second HMR to be cooked M2 that needs to be cooked in the second area 11*d*-2 is seated.

The HMRs to be cooked M1 and M2 may include convenience foods, instant foods, and the like sold in the market.

The first seating portion 34*d* may be provided in the shape of a hole passing through the first cooking surface 34, and the second seating portion 35*d* may be provided in the shape of a hole passing through the second cooking surface 35. The first seating portion 34*d* may be provided as a hole whose shape corresponds to the shape of the first HMR to be cooked M1, and the second seating portion 35*d* may be provided as a hole whose shape corresponds to the shape of the second HMR to be cooked M2.

The first HMR to be cooked M1 may be provided to be inserted into the first seating portion 34*d.* The second HMR to be cooked M2 may be provided to be inserted into the second seating portion 35*d.*

However, the present disclosure is not limited thereto, and the first and second seating portions 34*d* and 35*d* may be provided as holes having various other shapes. Also, instead of being provided in the shape of a hole, the first seating portion 34*d* may be provided as one area on the first cooking surface 34, and the second seating portion 35*d* may be provided as one area on the second cooking surface 35.

That is, in a case in which the first seating portion 34*d* is formed as one area on the first cooking surface 34, and the second seating portion 35*d* is formed as one area on the second cooking surface 35, the first HMR to be cooked Mi may be disposed on the first seating portion 34*d,* and the second HAIR to be cooked M2 may be disposed on the second seating portion 35*d.*

The HMRs to be cooked M1 and M2 may be provided to be cooked at different cooking temperatures, and in a case in which the plurality of HMRs to be cooked M1 and M2 having different cooking temperatures are simultaneously cooked in the cooking chamber 11, a problem in which any one of the HMRs to be cooked M1 and M2 is not completely cooked may occur. Accordingly, each of the HMRs to be cooked M1 and M2 should be cooked at an optimum cooking temperature.

In a case in which the first HMR to be cooked M1 is cooked at a cooking temperature which is a temperature provided in the first area 11*d*-1, the first HMR to be cooked M1 may include a first indication area 34*c* formed on a package of the first HMR to be cooked M1.

Accordingly, the user may check the first indication area 34*c* formed on the package of the first HMR to be cooked M1 and may mount the first HMR to be cooked M1 on the first seating portion 34*d,* formed on the first cooking surface 34, to cook the first HMR to be cooked M1.

Also, in a case in which the second HMR to be cooked M2 is cooked at a cooking temperature which is a temperature provided in the second area 11*d*-2, the second HMR to be cooked M2 may include a second indication area 35*c* formed on a package of the second HMR to be cooked M2.

Accordingly, the user may check the second indication area 35*c* formed on the package of the second HMR to be cooked M2 and may mount the second HMR to be cooked M2 on the second seating portion 35*d,* formed on the second cooking surface 35, to cook the second HMR to be cooked M2.

Therefore, the user may look at the colors of the indication areas formed on the HMRs to be cooked M1 and M2 and place the HMRs to be cooked M1 and M2 on areas providing optimum cooking temperatures on indication areas whose colors correspond to the colors of the indication areas formed on the HMRs to be cooked M1 and M2. In this way, the HMRs to be cooked M1 and M2 can be cooked conveniently.

Also, as illustrated in FIG. 13, a shelf 30" may include a seating portion 30*d* on which a HMR to be cooked M3 having a plurality of accommodation spaces P1 and P2 formed therein is seated.

The shelf 30" may include a first indication area 34*c* formed on at least a portion of the first cooking surface 34. The first indication area 34*c* is an area in which a specific color is shown.

The shelf 30" may include a second indication area 35*c* formed on at least a portion of the second cooking surface 35. The second indication area 35*c* is an area in which a specific color, different from the color shown in the first indication area 34*c,* is shown.

The seating portion 30*d* may be formed as a single seating portion 30*d* across the first cooking surface 34 and the second cooking surface 35. That is, although the shelf 30' disclosed in FIG. 12 described above includes the plurality of seating potions 34*d* and 35*d* so that the plurality of HMRs to be cooked M1 and M2, respectively disposed on the cooking surfaces 34 and 35, are seated thereon, the shelf 30" according to another embodiment of the present disclosure may include the sealing portion 30*d* provided so that a single HMR to be cooked M3 having a large capacity is seated thereon.

A first accommodation space P1 and a second accommodation space P2 which are configured to accommodate objects to be cooked whose cooking temperatures are different may be provided in the HMR to be cooked M3.

In a case in which an object to be cooked accommodated in the first accommodation space P1 is cooked at a cooking temperature which is a temperature provided in the first area 11*d*-1, a first indication area 34*c* may be formed on the first accommodation space P1.

In a case in which an object to be cooked accommodated in the second accommodation space P2 is cooked at a cooking temperature which is a temperature provided in the second area 11*d*-2, a second indication area 35*c* may be formed on the second accommodation space P2.

The present disclosure is not limited thereto, and the first and second indication areas 34*c* and 35*c* may be formed at positions on a package of the HMR to be cooked M3 that correspond to the first and second accommodation spaces P1 and P2 in the package of the HMR to be cooked M3.

Accordingly, the user may check the first and second indication areas 34*c* and 35*c* formed on the first and second accommodation spaces P1 and P2 and may mount the HMR to be cooked M3 on the seating portion 30*d* so that the first accommodation space P1 is placed on the first cooking surface 34 and the second accommodation space P2 is placed on the second cooking surface 35.

Accordingly, a plurality of objects to be cooked which are accommodated in the same storage container M3 and have different cooking temperatures may each receive heat at a suitable cooking temperature and be simultaneously cooked inside the cooking chamber 11.

Specific embodiments illustrated in the drawings have been described above. However, the present disclosure is not limited to the embodiments described above, and those of ordinary skill in the art to which the disclosure pertains may make various changes thereto without departing from the gist of the technical spirit of the disclosure defined in the claims below.

Although the present disclosure has been described with various embodiments, various changes and modifications may be suggested to one skilled in the art. It is intended that the present disclosure encompass such changes and modifications as fall within the scope of the appended claims.

What is claimed is:

1. A cooking apparatus comprising:
- a cooking chamber open in a front-rear direction;
- a first heating source disposed on an upper side of the cooking chamber and including a plurality of heaters;
- a second heating source disposed on a lower side of the cooking chamber and including a magnetron configured to generate high-frequency waves; and
- a shelf provided to be insertable into the cooking chamber in the front-rear direction and configured to divide the cooking chamber in a vertical direction,
- wherein the cooking chamber includes a first cooking area formed above the shelf and a second cooking area formed below the shelf, the first cooking area supporting a first object to be cooked using the first heating source and the second heating source and the second cooking area supporting a second object to be cooked using the second heating source,
- wherein the shelf includes a (i) cooking surface facing the first heating source and configured to support the first object to be cooked and (ii) a heat generator facing the second heating source and configured to generate heat due to the high-frequency waves oscillated from the second heating source and transfer the heat to the cooking surface,
- wherein the shelf is disposed closer to the first heating source than to the second heating source,
- wherein the cooking surface includes a first cooking surface disposed to correspond to a first heater among the plurality of heaters in the vertical direction and a second cooking surface disposed to correspond to a second heater among the plurality of heaters in the vertical direction, and
- a temperature of heat supplied to the first cooking surface by the first heater is different than a temperature of heat supplied to the second cooking surface by the second heater.

2. The cooking apparatus of claim 1, wherein a separation distance between a lower end of the plurality of heaters and the cooking surface is up to 100 mm or less.

3. The cooking apparatus of claim 1, wherein:
- each of the plurality of heaters include a long axis extending in the front-rear direction;
- the first heater among the plurality of heaters is disposed at a first position in a left-right direction with respect to a center of the cooking chamber; and
- the second heater among the plurality of heaters is disposed at a second position which is a position opposite to the first position with respect to the center of the cooking chamber.

4. The cooking apparatus of claim 3, wherein the cooking surface is provided in a substantially quadrangular shape and is provided to have a long side in the left-right direction and a short side in the front-rear direction.

5. The cooking apparatus of claim 4, wherein a length of the long side is 1.5 to 2 times a length of the short side.

6. The cooking apparatus of claim 1, wherein:
- the first cooking surface is provided so that the first object to be cooked is placed thereon; and
- the second cooking surface is provided so that a third object to be cooked is placed thereon, wherein a cooking temperature of the third object to be cooked is different from a cooking temperature of the first object to be cooked and which is cooked.

7. The cooking apparatus of claim 6, further comprising:
- a first light configured to radiate light of a first color toward the first cooking surface; and
- a second light configured to radiate light of a second color different from the first color toward the second cooking surface.

8. The cooking apparatus of claim 6, wherein:
- the first heater includes a first color filter provided so that a first color is shown during heat generation; and
- the second heater includes a second color filter provided so that a second color different from the first color is shown during heat generation.

9. The cooking apparatus of claim 6, wherein:
- the first cooking surface includes a first seating portion on which a first container holding the first object to be cooked is seated; and
- the second cooking surface includes a second seating portion on which a second container holding the third object to be cooked is seated.

10. The cooking apparatus of claim 9, wherein the first seating portion and the second seating portion are each shaped as a hole that is open in the vertical direction.

11. The cooking apparatus of claim 6, wherein:

the shelf further includes a seating portion on which a container including a first accommodation space configured to hold the first object to be cooked and a second accommodation space configured to hold the third object to be cooked is seated; and the seating portion is provided so that the first accommodation space is disposed at a position corresponding to the first heater in the vertical direction and the second accommodation space is disposed at a position corresponding to the second heater in the vertical direction.

12. The cooking apparatus of claim 1, wherein an area of the shelf in the vertical direction is between 0.9 to 1 times an area of the cooking chamber in the vertical direction.

13. The cooking apparatus of claim 1, wherein:

the cooking surface is formed on an upper surface of the shelf, and the heat generator is disposed on a lower surface of the shelf; and an area of the cooking surface in the vertical direction corresponds to an area of the heat generator in the vertical direction.

14. The cooking apparatus of claim 1, wherein:

the second heating source further include a stirrer configured to transmit the high-frequency waves generated from the magnetron to an interior of the cooking chamber; and the stirrer is provided in a circular shape having a diameter of at least 150 mm.

15. The cooking apparatus of claim 14, wherein a circumferential portion of the stirrer is 30 mm.

16. The cooking apparatus of claim 1, wherein the plurality of heaters of the first heat source include four heaters.

17. The cooking apparatus of claim 1, further comprising a door configured to open and close access to the cooking chamber.

18. The cooking apparatus of claim 17, wherein a portion of the door includes a transparent member.

19. The cooking apparatus of claim 17, further comprising an input device disposed on the door, the input device configured to obtain a signal to control the cooking apparatus.

* * * * *